No. 872,486. PATENTED DEC. 3, 1907.
F. F. WEAR.
SCALE.
APPLICATION FILED AUG. 1, 1905.
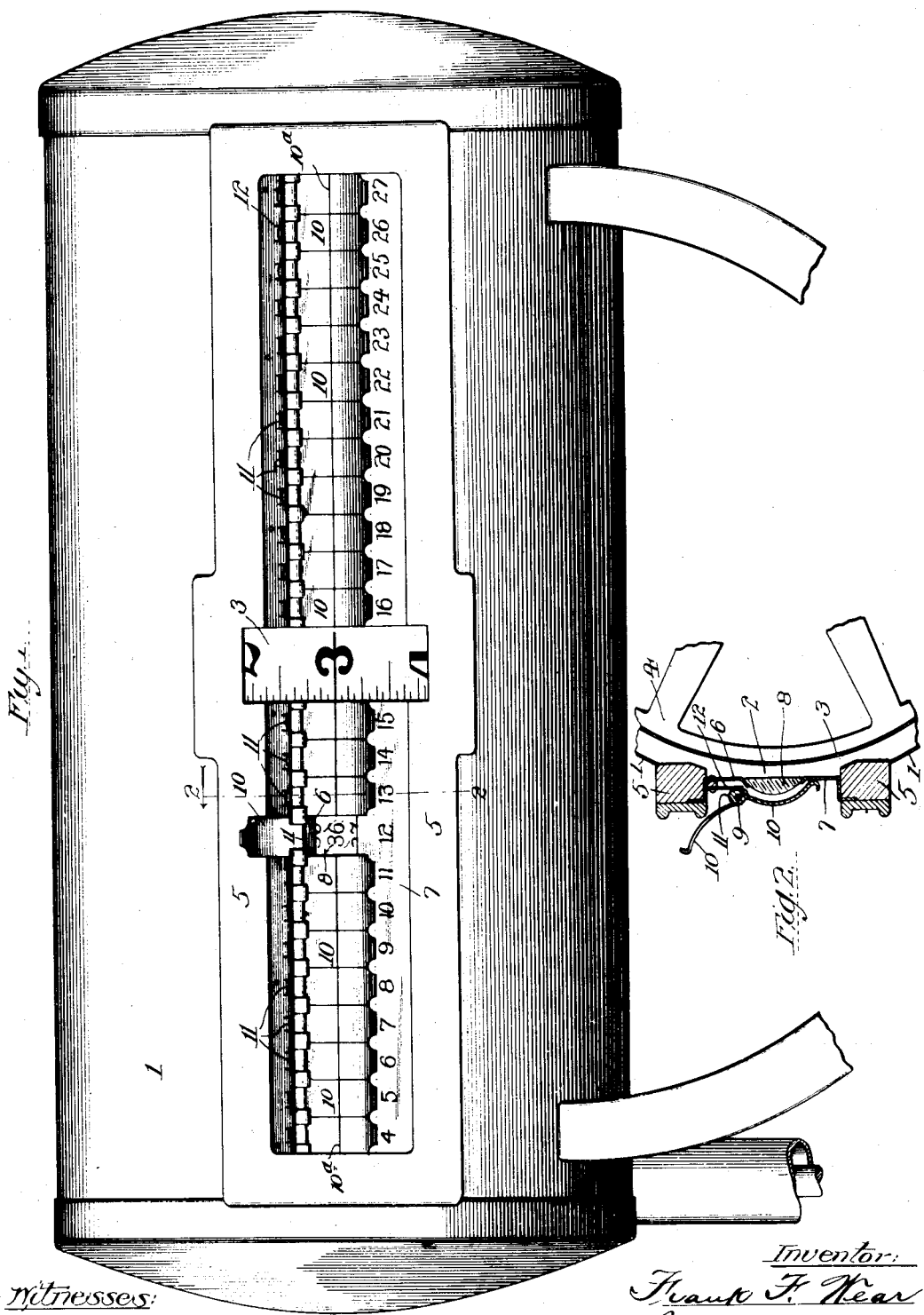

UNITED STATES PATENT OFFICE.

FRANK F. WEAR, OF SAN FRANCISCO, CALIFORNIA, ASSIGNOR TO TOLEDO COMPUTING SCALE COMPANY, OF TOLEDO, OHIO, A CORPORATION OF NEW JERSEY.

SCALE.

No. 872,486.  Specification of Letters Patent.  Patented Dec. 3, 1907.

Application filed August 1, 1905. Serial No. 272,180.

*To all whom it may concern:*

Be it known that I, FRANK F. WEAR, a citizen of the United States, and a resident of San Francisco, in the county of San Francisco and State of California, have invented certain new and useful Improvements in Scales, of which the following is a specification.

My invention relates to scales of the computing type and the object thereof is to provide means for covering or obscuring from view any desired number of the series of columns of figures on the computing chart corresponding to one or more of the indications for the prices per pound, or other unit of weight.

In the present instance, my invention is shown embodied in a scale of the drum or cylinder type, in which the computing chart or table is mounted on a rotatable drum and whose computations or price totals are adapted to be exposed through a transverse slot or sight opening in an outer cylinder or housing, although, as will be evident from the description hereinafter given, my invention is not to be restricted in its application or scope to such particular type of scale. Ordinarily, in the type of scales just referred to the sight opening exposes all the series of columns of figures which correspond with the different prices per pound or other unit of weight which appear on one side or edge of the sight opening, generally the lower edge, so that in reading the scale the salesman must first pick out the proper price per pound among the transverse row of such different prices and then read the price total corresponding to that particular price per pound. It frequently happens, however, that some particular scales in a store are employed in dispensing a limited number of commodities at a limited number of different prices per unit of weight, so that certain of the price totals on the chart are in effect unnecessary, inasmuch as only those price totals which correspond to the particular prices per pound of such articles are required to be read. Consequently, it is desirable under such conditions to provide means whereby only that series or column of figures representing the active prices per unit of weight shall be exposed, the remaining price totals of the chart being covered or obscured from view, and such is the object of my invention.

In the drawings, Figure 1 is a side elevation of the computing portion of a drum or cylinder type of scale, and Fig. 2 a section on the line 2—2 of Fig. 1.

Although I have shown my invention as applied to the well known form of drum or cylinder scales, it will be understood that my invention is not to be limited thereto, except where the claims expressly so require. It is evident that my invention is applicable to other forms and constructions of scale and in fact I contemplate using my invention wherever applicable.

Referring to the present embodiment of my invention, the computing devices of the illustrated scale comprise an outer casing or housing 1, having as usual, a transverse slot 2 forming the sight opening for the purpose of exposing the computing chart or table 3. This chart, on which are printed the usual series or columns of figures representing the price totals at different prices per pound is mounted as usual upon a rotatable frame 4 and connected with the operating parts of the scale in a way which is so well known as not to require illustration or description. As is usual, the sight opening is edged with a frame having parallel transverse bars or strips 5, between which are arranged inwardly directed strips 6 and 7 approaching each other and forming the sight opening proper, in which is secured as usual a longitudinal lens 8. The lower strip is provided, as shown in Fig. 1, with the series of figures which, in the present instance, run from 4 to 27, representing the different prices per pound and correspond in relative position with the series or columns of price totals on the drum. As usual, the chart is provided with a central series of figures representing weights, the scale, according to the illustration, representing a load of three pounds.

Upon a suitable transverse rod or rods 9 are pivoted a series of independently operable and similar shutters 10 corresponding in number to the number of different prices per pound indicated on the scale and corresponding also, of course, to the number of different series of price totals. These shutters are pivoted, as shown, at a point above the sight opening proper in such a manner that when open the same expose the chart beneath, but when in lowered position cover or obscure the particular series or column of price totals, to which it corresponds. Suitable means are provided for maintaining with a yielding pressure each shutter in either raised or closed position, as the case may be and as shown in Fig. 2, I accomplish this result by providing the eye or bearing portion of each shutter with an extension or cam face 11 arranged to bear against a spring plate 12, in such manner as to be held by the spring in either one position or the other, as is evident.

The shutters are independently operable, with the result that the salesman is enabled to raise or open any one or more of the shutters according to the different prices per pound, of the article or articles to be sold by that particular scale, thereby permitting only those series of price totals corresponding with the opened shutters exposed through the sight opening and leaving all of the other price totals, which are inactive under the particular conditions of use of the scale, covered or obscured. By these means, the salesman is able to read the price total with greater readiness and facility than when all of the price totals corresponding to the different prices per pound are exposed to view through the sight opening.

According to the present illustration, the shutter corresponding to the 12¢ price per pound has been opened and all of the other shutters remain closed, so that when the load of three pounds is placed upon the scale the price total, "36", is alone exposed through the sight opening. It will be understood, however, that in practice a plurality of the shutters may be open and kept open for selling different articles at different prices per pound and also that it is not intended that each shutter shall be opened for each transaction, but that the particular shutters representing the different prices per pound at which the articles are to be sold that day on the scale are opened and left open for all transactions. For instance, in case the scale was used by a butcher selling different meats or qualities of meat at four different prices, for instance at 12¢, 16¢, 18¢ and 20¢ per pound, the particular shutters corresponding to those prices would be lifted and left in that condition for the day or other period of time, when these prices obtain. Thus, when there is no considerable variation in the different prices per pound of the different articles sold by a scale, the reading of the price total by the salesman may be greatly facilitated by the use of my invention.

By preference, I provide the backs of the shutters with the transverse indicating line 10ª which indicates the correct place at which to read the price totals in the sight opening where the shutter is raised. For instance, in Fig. 1, the lines 10ª on the two shutters on either side of the raised shutter indicate that the value of the article is exactly 36¢, inasmuch as the number "36" comes exactly opposite said lines.

According to the present construction, the shutters are curved outwardly in order to fit properly over the sight opening, and particularly the lens or magnifying glass at such opening. Moreover, the inner face of each shutter is provided with a reflecting surface formed in any suitable manner, with the resulting advantage that when a shutter is raised or opened, such surface will serve to reflect the light directly upon the column of price totals with which it corresponds and thereby illuminate the price total which is to be read by the salesman.

It will be understood, as hereinbefore suggested, that any suitable means may be employed for holding the shutters in one position or the other with a yielding pressure or in such manner that they will be maintained in raised or opened position, as the case may be. In the present instance, each shutter is held in open or closed position by spring pressure afforded by the spring plate 12 hereinbefore referred to. According to the illustrated construction, this plate is formed as a strip secured to the plate 6 and having a series of slits entering from its lower edge so as to provide the springs proper arranged in the path of movement of the extension or cam face 11 hereinbefore referred to. However, this particular feature of construction is subject to considerable variation mechanically and I therefore do not limit myself to the precise construction and arrangement shown, in this respect.

I claim:

1. The combination with a chart of computations and a price scale relatively movable, of a series of shutters adjacent the price scale and fixedly located with relation thereto, there being a shutter for each division thereof, said shutters when closed concealing the chart but leaving the price scale exposed and each shutter being independently movable to expose a division of the chart representing multiples of the associated price unit of the scale.

2. The combination with a chart of computations and a price scale relatively movable, of a series of shutters adjacent the price scale and fixedly located with relation thereto, there being a shutter for each division thereof, said shutters when closed concealing the chart but leaving the price scale exposed and each shutter being independently movable to expose a division of the chart representing multiples of the associated price unit of the scale and having a reading line to guide the eye when the shutter is closed and an adjacent one open.

3. In a scale, the combination, with a housing having a sight opening or slot, a computing chart mounted in the housing and having different series or columns of figures representing values at different prices per pound of a series of shutters hinged upon the housing at one side of the sight opening, said shutters being independently movable to obscure or expose any desired column of figures, each shutter having on its back a line indicating the correct point at which to take the reading; substantially as described.

4. In a scale, the combination, with a computing chart having different series or columns of figures representing values at different prices per pound, of a series of shutters corresponding in number to the different columns and adapted to stand open at an angle to the chart, each of said shutters having a reflecting surface on its inner face for casting light upon the chart; substantially as described.

5. In a scale, the combination, with a computing chart having different series or columns of figures representing values at different prices per pound, of a series of shutters corresponding in number to the different columns, each of said shutters being curved and having a reflecting side on its inner surface for casting light upon the chart; substantially as described.

FRANK F. WEAR.

Witnesses:
S. E. HIBBEN,
ALLEN DE VILBISS, Jr.

---

It is hereby certified that in Letters Patent No. 872,486, granted December 3, 1907, upon the application of Frank F. Wear, of San Francisco, California, for an improvement in "Scales," errors appear in the printed specification requiring correction, as follows: In line 24, page 3, the word "side" should read *surface*, and in line 25, same page, the word "surface" should read *side;* and that the said Letters Patent should be read with these corrections therein that the same may conform to the record of the case in the Patent Office.

Signed and sealed this 17th day of December, A. D., 1907.

[SEAL.]

C. C. BILLINGS.

*Acting Commissioner of Patents.*